United States Patent
Wang et al.

(10) Patent No.: US 12,509,394 B2
(45) Date of Patent: Dec. 30, 2025

(54) SELF-CURING FLUID SOLIDIFIED SOIL COMPOSITE CURING AGENT AND ITS APPLICATION

(71) Applicant: Tianjin Municipal Engineering Design & Research Institute Co., Ltd., Tianjin (CN)

(72) Inventors: Xinqi Wang, Tianjin (CN); Yanduo Li, Tianjin (CN); Chaohui Wang, Tianjin (CN); Yanqing Du, Tianjin (CN); Zhiliang Huo, Tianjin (CN); Wei Zeng, Tianjin (CN); Runyou Liu, Tianjin (CN); Peixiang Xie, Tianjin (CN); Penghui Wen, Tianjin (CN); Qiang Zhang, Tianjin (CN); Liqiang Sun, Tianjin (CN); Wei Guo, Tianjin (CN); Guoliang Zhang, Tianjin (CN); Maohua Dai, Tianjin (CN); Hengliang Fang, Tianjin (CN)

(73) Assignee: Tianjin Municipal Engineering Design & Research Institute Co., Ltd., Tianjin (CN)

( * ) Notice: Subject to any disclaimer, the term of this patent is extended or adjusted under 35 U.S.C. 154(b) by 321 days.

(21) Appl. No.: 18/240,972

(22) Filed: Aug. 31, 2023

(65) Prior Publication Data

US 2024/0217877 A1 Jul. 4, 2024

(30) Foreign Application Priority Data

Jan. 3, 2023 (CN) .......................... 202310000954.1

(51) Int. Cl.
| | | |
|---|---|---|
| *C04B 22/12* | (2006.01) | |
| *C04B 7/02* | (2006.01) | |
| *C04B 7/32* | (2006.01) | |
| *C04B 18/06* | (2006.01) | |
| *C04B 24/00* | (2006.01) | |
| *C04B 103/00* | (2006.01) | |
| *C04B 111/00* | (2006.01) | |

(52) U.S. Cl.
CPC .............. *C04B 22/124* (2013.01); *C04B 7/02* (2013.01); *C04B 7/32* (2013.01); *C04B 18/064* (2013.01); *C04B 18/067* (2013.01); *C04B 24/00* (2013.01); *C04B 2103/0001* (2013.01); *C04B 2111/0006* (2013.01)

(58) Field of Classification Search
CPC .......... C04B 22/124; C04B 7/02; C04B 7/32; C04B 18/064; C04B 18/067; C04B 24/00; C04B 2103/0001; C04B 2111/0006; C04B 2111/00724; C04B 28/025; C04B 28/04; C04B 28/065; Y02W 30/91
See application file for complete search history.

(56) References Cited

FOREIGN PATENT DOCUMENTS

| CN | 101597193 | A | | 12/2009 | |
|---|---|---|---|---|---|
| CN | 108531433 | A | | 9/2018 | |
| CN | 109626909 | A | | 4/2019 | |
| CN | 109678447 | A | * | 4/2019 | ............. C04B 28/14 |
| CN | 110015824 | A | | 7/2019 | |
| CN | 111718720 | A | | 9/2020 | |
| CN | 112142406 | A | | 12/2020 | |
| CN | 113214835 | A | | 8/2021 | |
| CN | 114031709 | A | | 2/2022 | |

OTHER PUBLICATIONS

Guoqi Mao et al., Polyvinyl Acetate Emulsion Modified by Urea, Journal of Northeast Forestry University, Feb. 8, 2011.

* cited by examiner

*Primary Examiner* — Anthony J Green

(57) ABSTRACT

The present disclosure discloses a self-curing fluid solidified soil composite curing agent and its application, which is composed of the following raw materials by mass percentage: 30-35% of cement, 10-20% of slag, 10-20% of gypsum, 5-8% of calcium carbide slag, 30-39% of microbial curing agent, 1-5% of self-curing microbeads. The present disclosure can effectively improve the compressive strength of the fluid solidified soil while ensuring the early fluidity of the fluid solidified soil, inhibit the shrinkage deformation of the fluid solidified soil, and improve the durability of the fluid solidified soil. The present disclosure improves the recycling rate of solid waste resources and has the characteristics of low cost and remarkable environmental protection effect under the premise of ensuring the application effect, which is suitable for large-scale promotion and application.

9 Claims, No Drawings

SELF-CURING FLUID SOLIDIFIED SOIL COMPOSITE CURING AGENT AND ITS APPLICATION

CROSS-REFERENCE TO RELATED APPLICATION

This application claims priority from the Chinese patent application 202310000954.1 filed Jan. 3, 2023, the content of which are incorporated herein in the entirety by reference.

TECHNICAL FIELD

The present disclosure belongs to the field of road engineering materials, and particularly relates to a self-curing fluid solidified soil composite curing agent and its application.

BACKGROUND

As a new type of backfill material, fluid solidified soil can be used to replace traditional fillers in roadbed filling, pipe gallery backfilling, abutment backfilling, and other scenarios. It has the characteristics of abundant raw materials, self-leveling, self-compacting, and moderate strength, which can effectively solve the problems of large demand for natural resources, serious dust pollution, and insufficient compaction in the narrow space of traditional fillers. In addition, due to the extremely high raw material inclusiveness of the fluid solidified soil, blast furnace slag, carbide slag, and muddy soil can be used as raw materials of fluid solidified soil, showing great potential for intensive utilization of waste resources. In recent years, slag, carbide slag, and other inorganic solid waste materials have been used to prepare fluid solidified soil. Although such curing agents have achieved the effect of making full use of waste resources, the prepared fluid solidified soil still has problems such as low strength, large shrinkage deformation, and poor durability. How to further ensure the compressive strength of fluid solidified soil during use on the basis of making full use of solid waste resources and improving its shrinkage deformation and durability has become an urgent problem to be solved.

SUMMARY

The present disclosure aims to overcome the shortcomings in the prior art, such as low compressive strength, large shrinkage deformation and poor durability of the fluid solidified soil, and to provide a self-curing fluid solidified soil composite curing agent with high compressive strength, small shrinkage deformation, and excellent durability.

The second purpose of the disclosure is to provide an application of the self-curing fluid solidified soil composite curing agent.

The technical scheme of the disclosure is summarized as follows:

A self-curing fluid solidified soil composite curing agent is composed of the following raw materials by mass percentage: 30-35% of cement, 10-20% of slag, 10-20% of gypsum, 5-8% of calcium carbide slag, 30-39% of microbial curing agent, 1-5% of self-curing microbeads.

The cement is selected from one of ordinary Portland cement, Portland cement, sulphoaluminate cement, and high belite sulphoaluminate cement.

Preferably, the slag is S95-grade slag powder, and the specific surface area is greater than or equal to 400 m²/kg.

Preferably, the calcium sulfate content of the gypsum is greater than or equal to 80%.

Preferably, the mass content of calcium hydroxide in the calcium carbide slag is greater than or equal to 80%, and after drying at the temperature of 90° C. to 110° C. and grinding, the specific surface area is greater than 300 m²/kg.

Preferably, the microbial curing agent is composed of a cementing solution with a volume ratio of 1:(2-4) and a *Bacillus pasteurii* solution.

Preferably, the cementing solution is composed of a urea aqueous solution with a concentration of 1 mol/L and a calcium chloride aqueous solution with a concentration of 1 mol/L having a volume ratio of 1:1.

Preferably, the $OD_{600}$ of *Bacillus pasteurii* solution is 0.8 to 1.2.

Preferably, the self-curing microbeads are prepared by the following method:

(1) weighing raw materials according to the mass percentage: 15-25% of polyvinyl acetate with an average molecular weight of 100000-500000, 10-20% of urea, 55-60% of calcium chloride, 5-10% of sodium polyacrylate with a molecular weight of 1 to 15 million, and the nitrogen content of the urea is greater than or equal to 45%;

(2) adding the sodium polyacrylate and calcium chloride to a granulator, stirring at 400-500 r/min to obtain a core material with a diameter of 1-1.5 mm;

(3) grinding and sieving the urea through a 80-100 mesh sieve, adding the polyvinyl acetate, stirring for 1-3 min to obtain a mixed slurry;

(4) loading the core material obtained by step (2) into the multi-functional granulating and coating machine, spraying the mixed slurry obtained by step (3), and solidifying to obtain self-curing microbeads with a diameter of less than 3 mm.

The application of the above-mentioned self-curing fluid solidified soil composite curing agent in the preparation of fluid solidified soil.

The present disclosure has the advantages of:

(1) The present disclosure can effectively improve the compressive strength of the fluid solidified soil while ensuring the early fluidity of the fluid solidified soil, inhibit the shrinkage deformation of the fluid solidified soil, and improve the durability of the fluid solidified soil.

(2) The present disclosure improves the recycling rate of solid waste resources and has the characteristics of low cost and remarkable environmental protection effect under the premise of ensuring the application effect, which is suitable for large-scale promotion and application.

(3) The self-curing composite curing agent in this disclosure has a wide range of raw materials, a simple preparation process, simple operation, no complex process, low requirements for operators, and is suitable for large-scale production.

DETAILED DESCRIPTION OF THE PRESENT DISCLOSURE

In order to make the objectives, technical solutions, and advantages of the present disclosure more clearly, the working process and principles of the present disclosure will be further described below with reference to specific embodiments.

The disclosure adopts the model HJ-180-GC multi-functional granulating and coating machine, which is not used for limiting the disclosure. The multi-functional granulating and coating machine produced by other enterprises can also be used in the disclosure.

The *Bacillus pasteurii* solution used in each embodiment is prepared by the following steps:

Step (1) The liquid medium sterilized by high temperature steam was placed on a sterile operation table for standby. An ampoule bottle containing freeze-dried powder of *Sporosarcina Pasteurii*(B80469, Jul. 20, 2022, China, https://www.mingzhoubio.com/goods-245350.html) was placed on an alcohol lamp and heated. Several drops of water were dropped to break the outer wall and the inner tube was taken out, and an appropriate amount of liquid medium was injected into the inner tube of the ampoule bottle with a sterile pipette to dissolve the freeze-dried powder. The dissolved bacteria were injected into the liquid medium that had been sterilized, and then a small amount of bacterial liquid was taken with the inoculation ring to draw a line on the slope to complete the activation of the bacteria and place it in the refrigerator at 4° C. for storage.

Step (2) 350 ml liquid medium was poured into 500 ml conical flask, the mouth of the bottle was plugged with cotton, and then put the conical flask into a high-temperature sterilization pot for sterilization for 20 min; after the pressure of the sterilization pot is reduced, the conical flask was taken out and put into a sterile operating table, UV disinfection was performed for 30 min, and the liquid medium was cooled to room temperature. The bacteria stored on the plate were then inoculated into a conical flask containing a liquid culture medium with an inoculation stick. The above operations are repeated for several times until an obvious white precipitate appeared at the bottom of the conical flask. The conical flask after inoculation was placed in an oscillator with a temperature of 30° C. and a speed of 130 r/min. The liquid medium gradually became turbid from the beginning of clarification, indicating that the bacteria were growing and reproducing.

Step (3) The conductivity meter was used to measure the activity of the strain obtained in step (2), the spectrophotometer was used to measure the concentration of the test strain, and the bacterial culture was checked. If the $OD_{600}$ of the *Bacillus pasteurii* solution was 0.8-1.2, it was judged to meet the requirements, and the bacterial liquid was reserved for standby.

The liquid medium included the following materials: 20 g of casein peptone, 10 g of ammonium bicarbonate, 20 g of urea, 1.5 g of sodium hydroxide, and 1 L of distilled water.

Embodiment 1

Self-curing microbeads are prepared by the following steps:

Step (1) weighing raw materials according to the mass percentage: 20% of polyvinyl acetate with an average molecular weight of 300000, 15% of urea, 57% of calcium chloride, 8% of sodium polyacrylate with a molecular weight of 10 million, and the nitrogen content of the urea is 45.2%;

Step (2) adding the sodium polyacrylate and calcium chloride to a granulator respectively, stirring at 450 r/min to obtain a core material with a diameter of 1-1.5 mm;

Step (3) grinding and sieving the urea through a 100 mesh sieve, adding the polyvinyl acetate, stirring for 2 min to obtain a mixed slurry;

Step (4) loading the core material obtained by step (2) into the HJ-180-GC multi-functional granulating and coating machine, spraying the mixed slurry obtained by step (3), and solidifying to obtain self-curing microbeads with a diameter of less than 3 mm.

Embodiment 2

Self-curing microbeads are prepared by the following steps:

Step (1) weighing raw materials according to the mass percentage: 15% of polyvinyl acetate with an average molecular weight of 100000, 20% of urea, 60% of calcium chloride, 5% of sodium polyacrylate with a molecular weight of 15 million, and the nitrogen content of the urea is 45%;

Step (2) adding the sodium polyacrylate and calcium chloride to a granulator respectively, stirring at 400 r/min to obtain a core material with a diameter of 1-1.5 mm;

Step (3) grinding and sieving the urea through a 90 mesh sieve, adding the polyvinyl acetate, stirring for 1 min to obtain a mixed slurry;

Step (4) loading the core material obtained by step (2) into the FLP-1 multi-functional granulating and coating machine, spraying the mixed slurry obtained by step (3), and solidifying to obtain self-curing microbeads with a diameter of less than 3 mm.

Embodiment 3

Self-curing microbeads are prepared by the following steps:

Step (1) weighing raw materials according to the mass percentage: 25% of polyvinyl acetate with an average molecular weight of 500000, 10% of urea, 55% of calcium chloride, 10% of sodium polyacrylate with a molecular weight of 1 million, and the nitrogen content of the urea is 45.8%;

Step (2) adding the sodium polyacrylate and calcium chloride to a granulator respectively, stirring at 500 r/min to obtain a core material with a diameter of 1-1.5 mm;

Step (3) grinding and sieving the urea through a 80 mesh sieve, adding the polyvinyl acetate, stirring for 3 min to obtain a mixed slurry;

Step (4) loading the core material obtained by step (2) into the DPL-200 multi-functional granulating and coating machine, spraying the mixed slurry obtained by step (3), and solidifying to obtain self-curing microbeads with a diameter of less than 3 mm.

Embodiment 4

A self-curing fluid solidified soil composite curing agent is composed of the following raw materials by the mass percentage: 31% of cement, 15% of slag, 15% of gypsum, 6% of calcium carbide slag, 30% of microbial curing agent, 3% of self-curing microbeads prepared in Embodiment 1.

The cement is P•O 42.5 ordinary Portland cement.

The slag is S95-grade slag powder, and the specific surface area is 420 $m^2$/kg.

The content of calcium sulfate in gypsum is 83%.

The mass content of calcium hydroxide in the calcium carbide slag is 80%, and after drying at 100° C. and grinding, the specific surface area is 350 $m^2$/kg.

The microbial curing agent is composed of a cementing solution with a volume ratio of 1:3 and a *Bacillus pasteurii* solution.

The cementing solution is composed of a urea aqueous solution with a concentration of 1 mol/L and a calcium chloride aqueous solution with a concentration of 1 mol/L having a volume ratio of 1:1.

The $OD_{600}$ of *Bacillus pasteurii* solution was 1.

Embodiment 5

A self-curing fluid solidified soil composite curing agent is composed of the following raw materials by mass percentage: 30% of cement, 20% of slag, 10% of gypsum, 8% of carbide slag, 30% of microbial curing agent, and 2% of self-curing microbeads prepared in Embodiment 2.

The cement is P•II 52.5 Portland cement.

The slag is S95-grade slag powder, and the specific surface area is 400 $m^2$/kg.

The content of calcium sulfate in gypsum is 85%.

The mass content of calcium hydroxide in the calcium carbide slag is 81%, and after drying at 90° C. and grinding, the specific surface area is 400 $m^2$/kg.

The microbial curing agent is composed of a cementing solution with a volume ratio of 1:2 and a *Bacillus pasteurii* solution.

The cementing solution is composed of a urea aqueous solution with a concentration of 1 mol/L and a calcium chloride aqueous solution with a concentration of 1 mol/L having a volume ratio of 1:1.

The $OD_{600}$ of *Bacillus pasteurii* solution was 0.8.

Embodiment 6

A self-curing fluid solidified soil composite curing agent is composed of the following raw materials by mass percentage: 30% of cement, 10% of slag, 20% of gypsum, 5% of carbide slag, 30% of microbial curing agent, and 5% of self-curing microbeads prepared by Embodiment 3.

The cement is SAC42.5 sulphoaluminate cement.

The slag is S95-grade slag powder, and the specific surface area is 430 $m^2$/kg.

The content of calcium sulfate in gypsum is 80%.

The mass content of calcium hydroxide in the calcium carbide slag is 82%, and after drying at 110° C. and grinding, the specific surface area is 400 $m^2$/kg.

The microbial curing agent is composed of a cementing solution with a volume ratio of 1:4 and a *Bacillus pasteurii* solution.

The cementing solution is composed of a urea aqueous solution with a concentration of 1 mol/L and a calcium chloride aqueous solution with a concentration of 1 mol/L having a volume ratio of 1:1.

The $OD_{600}$ of *Bacillus pasteurii* solution was 1.2.

Embodiment 7

A self-curing fluid solidified soil composite curing agent is composed of the following raw materials by mass percentage: 35% of cement, 10% of slag, 10% of gypsum, 5% of carbide slag, 39% of microbial curing agent, and 1% of self-curing microbeads prepared by Embodiment 1.

The cement is BS-CFR 42.5 high belite sulphoaluminate cement.

The slag is S95-grade slag powder, and the specific surface area is 450 $m^2$/kg.

The content of calcium sulfate in gypsum is 87%.

The mass content of calcium hydroxide in the calcium carbide slag is 83%, and after drying at 100° C. and grinding, the specific surface area is 500 $m^2$/kg.

The microbial curing agent is composed of a cementing solution with a volume ratio of 1:3 and a *Bacillus pasteurii* solution.

The cementing solution is composed of a urea aqueous solution with a concentration of 1 mol/L and a calcium chloride aqueous solution with a concentration of 1 mol/L having a volume ratio of 1:1.

The $OD_{600}$ of *Bacillus pasteurii* solution was 1.1.

Embodiment 8

The preparation and testing method of fluid solidified soil include the following steps:

Step (1): adjusting the slurry to 70% moisture content and stirring by a hand-held mixer to stir at 200 r/min for 2 min to mix evenly;

Step (2): adding the P•O42.5 ordinary Portland cement, slag, gypsum, calcium carbide slag, microbial curing agent, and self-curing microbeads prepared by embodiment 1 according to the mass percentage of Embodiment 4 to the slurry obtained by the above step (1) in turn; the mass ratio of raw materials to the slurry obtained by the step (1) is 10:100, and the hand-held mixer is used to stir at 200 r/min for 3 min so that it is mixed evenly to obtain the fluid solidified soil.

Step (3): the fluidity test of the fluid solidified soil is carried out according to the ASTM D6103 specification issued by the American Society for Testing Materials (ASTM). The equipment required for the test mainly includes (Φ80 mm×80 mm cylinder, 50 cm×50 cm plate, ruler, etc. The ruler measures the maximum diameter of the collapse and the diameter in the vertical direction, and takes the average of the two as the fluidity of the cast-in-place solidified soil.

The preparation, curing, and unconfined compressive strength test of the specimens of the fluid solidified soil refer to the '*Technical Specification for Filling Engineering of Foamed Mixed Light Soil*' (CJJ/T 177-2012) and '*Standard for Basic Performance Test Methods of Building Mortar*' (JGJ/T 70-2009), and the unconfined compressive strength test of the fluid solidified soil is carried out. The test equipment mainly includes UTM universal testing machine, 100 mm×100 mm×100 mm triple mold, standard curing box, etc., and the loading speed is 1 mm/min.

The shrinkage deformation test piece of the fluid solidified soil adopts a test piece with a specification of 25 mm×25 mm×160 mm. After the test piece is formed, it is cured for 1 d and demoulded. After measured the initial length of the test piece, it is continuously sealing cured to the required age, and then measured the length. The deformation rate of the test piece is calculated as follows:

$$S = (L_e - L_0)/L \times 100\%$$

Where: S represents the deformation rate of the test piece cured to 28 d, %; $L_e$ represents length measurement value of the test piece cured to 28 d, mm; Lo represents initial length of the test piece, mm; L represents effective length of the test piece, which is 150 mm.

The durability test of fluid solidified soil is divided into dry-wet cycle test and freeze-thaw cycle test. The test instruments mainly include oven, soaking sink, low temperature test box, road material performance detector, and so on. The dry-wet cycle test method is as follows:

1) forming test piece according to the standard test piece forming method, and performing standard curing for 28 d;
2) after curing, immersing the test piece in water at room temperature for 5 hours, and then performing standard curing the test piece;
3) drying the test piece in an oven at 71° C. for 43 h, ending this cycle;
4) repeating step 2) and step 3) for 12 cycles to complete the test; If the test piece is damaged during the cycle, end the test.
5) After 12 dry-wet cycles, the test piece was cooled to room temperature, the unconfined compressive strength test was carried out, and the strength change rate was calculated according to the following formula.

$$K_n = \frac{R_n - R_0}{R_0} \times 100$$

Where $K_n$ represents change rate of compressive strength after dry-wet (freeze-thaw) cycle, %; $R_0$ represents test piece compressive strength, MPa; $R_n$ represents compressive strength of test piece after dry-wet (freeze-thaw) cycles, MPa.

The freeze-thaw cycle test method of fluid solidified soil is as follows:
1) forming test piece according to the standard test piece forming method, performing standard curing for 28 d;
2) on the day before the end of curing, tooking out the test piece and immersing it in the sink for 24 hours at room temperature; the water surface was above 2 cm above the top of the test piece, and then continuously performing standard curing the test piece;
3) putting the frozen-thawed test piece after immersion into the tray with 23 cm sponge pad at the bottom, injecting water to the extent that the bottom of the test piece just in contact with water, and then freezing the whole tray into the freezer in an environment of −10±5° C. for 24 h (excluding the time before reaching this temperature); after the test piece is frozen, placing the test pieces together with the tray in the standard maintenance room for dissolution for 24 h, ending a freeze-thaw cycle;
4) repeating step 3) for 12 times and ending. If the test piece is damaged during the cycle, end the test.
5) After 12 freeze-thaw cycles, the unconfined compressive strength test was carried out, and the strength change rate was calculated according to the strength change rate of the dry-wet cycle test. The performance test results of fluid solidified soil are shown in Table 1 and Table 2.

Embodiment 9

The preparation and testing of fluid solidified soil include the following steps:
(1) Adjusting the slurry to 70% moisture content and stirring by a hand-held mixer at the speed of 200 r/min for 2 min to mix evenly;
(2) according to the mass percentage of Embodiment 5, adding the P•II52.5 portland cement, slag, gypsum, calcium carbide slag, microbial curing agent, and self-curing microbeads prepared by embodiment 2 to the slurry obtained by step (1) in turn. The mass ratio of raw materials to the slurry obtained by step (1) is 15:100, and the hand-held mixer is used to stir at 200 r/min for 3 min, so that it is mixed evenly to obtain the fluid solidified soil.
(3) performing tests of the fluid solidified soil the same as the implementation of the step (3) of Embodiment 8, the test results of the performance of the fluid solidified soil are shown in Table 1 and Table 2.

Embodiment 10

The preparation and testing of fluid solidified soil include the following steps:
(1) Adjusting the slurry to 70% moisture content and stirring by a hand-held mixer at 200 r/min for 2 min to mix evenly;
(2) according to the mass percentage of Embodiment 6, adding SAC 42.5 sulphoaluminate cement, slag, gypsum, calcium carbide slag, microbial curing agent, and self-curing microbeads prepared by embodiment 3 to the slurry obtained by step (1) in turn. The mass ratio of raw materials to the slurry obtained by step (1) is 20:100, and the hand-held mixer is used to stir at 200 r/min for 3 min, so that it is mixed evenly to obtain the fluid solidified soil;
(3) performing tests of the fluid solidified soil the same as the implementation of the step (3) of Embodiment 8, the test results of the performance of the fluid solidified soil are shown in Table 1 and Table 2.

Embodiment 11

The preparation and testing of fluid solidified soil include the following steps:
(1) Adjusting the slurry to 70% moisture content and stirring by a hand-held mixer at 200 r/minI for 2 min to mix evenly;
(2) adding BS-CFR 42.5 high belite sulphoaluminate cement, slag, gypsum, calcium carbide slag, microbial curing agent, and self-curing microbeads prepared by the embodiment 1 according to the mass percentage of Embodiment 7 to the slurry obtained by step (1) in turn. The mass ratio of the raw material to the slurry obtained by step (1) was 15:100, and the slurry was stirred by a hand-held mixer at a speed of 200 r/min and a stirring time of 3 min to mix evenly to obtain a fluid solidified soil;
(3) performing tests of the fluid solidified soil the same as the implementation of the step (3) of Embodiment 8, the test results of the performance of the fluid solidified soil are shown in Table 1 and Table 2.

Comparative Test 1

The preparation and testing of fluid solidified soil include the following steps:
(1) Adjusting the slurry to 70% moisture content and stirring by a hand-held mixer at a speed of 200 r/min for 2 min to mix evenly;
(2) according to the mass percentage of Embodiment 4, adding 31% P•O42.5 ordinary portland cement, 15% slag, 15% gypsum, 6% calcium carbide slag, 33% microbial curing agent to the slurry obtained by step (1) in turn, the mass ratio of raw materials to the slurry obtained by the step (1) is 10:100, and the hand-held mixer is used to stir at a rotation speed of 200 r/min, and the stirring time is 3 min, so that it is mixed evenly to obtain the fluid solidified soil;

(3) performing tests of the fluid solidified soil the same as the implementation of the step (3) of Embodiment 8, the test results of the performance of the fluid solidified soil are shown in Table 1 and Table 2.

Comparative Test 2

The preparation and testing of fluid solidified soil include the following steps:

(1) Adjusting the slurry to 70% moisture content and stirring by a hand-held mixer to stir at 200 r/min for 2 min to mix evenly;

(2) according to the mass percentage of Embodiment 4, adding 46% P•O42.5 ordinary Portland cement, 30% slag, 15% gypsum, 6% calcium carbide slag, and 3% self-curing microbeads prepared in embodiment 1 to the slurry obtained by the step (1) in turn. The mass ratio of raw materials to the slurry obtained by step (1) is 10:100, and the hand-held mixer is used to stir at a speed of 200 r/min, and the stirring time is 3 min so that it is evenly mixed to obtain a fluid solidified soil;

(3) performing tests of the fluid solidified soil the same as the implementation of the step (3) of Embodiment 8, the test results of the performance of the fluid solidified soil are shown in Table 1 and Table 2.

Comparative Test 3

The preparation and testing of fluid solidified soil include the following steps:

(1) Adjusting the slurry to 70% moisture content and stirring by a hand-held mixer to stir at 200 r/min for 2 min to mix evenly.

(2) according to the mass percentage of Embodiment 4, adding 49% P•O42.5 ordinary portland cement, 30% slag, 15% gypsum, 6% calcium carbide slag to the slurry obtained by the step (1) in turn. The mass ratio of raw materials to the slurry obtained by the step (1) is 10:100, and the hand-held mixer is used to stir at a rotation speed of 200 r/min, and the stirring time is 3 min, so that it is evenly mixed to obtain the fluid solidified soil;

(3) performing tests of the fluid solidified soil the same as the implementation of the step (3) of Embodiment 8, the test results of the performance of the fluid solidified soil are shown in Table 1 and Table 2.

TABLE 1

Test results of fluidity and compressive strength of fluid solidified soil

| serial number | fluidity/mm | unconfined compression strength/MPa | | |
|---|---|---|---|---|
| | | 3 d | 14 d | 28 d |
| Embodiment 8 | 203 | 0.50 | 1.53 | 2.45 |
| Embodiment 9 | 195 | 0.56 | 1.64 | 2.58 |
| Embodiment 10 | 197 | 0.54 | 1.73 | 2.67 |
| Embodiment 11 | 190 | 0.65 | 2.10 | 2.95 |
| Comparative Test 1 | 205 | 0.48 | 1.25 | 2.12 |
| Comparative Test 2 | 187 | 0.40 | 1.03 | 1.78 |
| Comparative Test 3 | 185 | 0.35 | 0.86 | 1.54 |

TABLE 2

Dry shrinkage and durability test results of fluid solidified soil

| serial number | average dry shrinkage coefficient/$\times 10^{-6}$ | | | | Dry-wet cycle strength change rate/% | | | The change rate of freeze-thaw cycle strength/% | | |
|---|---|---|---|---|---|---|---|---|---|---|
| | 3 d | 14 d | 28 d | 45 d | Cycle 4 | Cycle 8 | Cycle 12 | Cycle 4 | Cycle 8 | Cycle 12 |
| Embodiment 8 | 68.7 | 198.3 | 256.7 | 280.4 | 16.8 | 10.6 | −7.2 | −13.9 | −36.2 | −56.1 |
| Embodiment 9 | 79.6 | 210.5 | 280.4 | 395.8 | 10.5 | 5.4 | −5.8 | −12.6 | −25.5 | −48.2 |
| Embodiment 10 | 85.3 | 220.9 | 300.4 | 310.5 | 12.8 | 7.6 | −4.7 | −4.7 | −18.6 | −34.6 |
| Embodiment 11 | 62.5 | 190.4 | 241.6 | 260.4 | 25.3 | 12.4 | −8.5 | −7.2 | −22.5 | −40.3 |
| Comparative Test 1 | 69.3 | 264.5 | 412.2 | 480.4 | 8.6 | −4.5 | −25.6 | −27.8 | −51.1 | −86.4 |
| Comparative Test 2 | 95.7 | 325.3 | 434.5 | 503.8 | 11.8 | 2.3 | −12.6 | −37.3 | −68.5 | −100 |
| Comparative Test 3 | 96.4 | 350.4 | 470.6 | 526.7 | 15.2 | 4.6 | −10.7 | −40.6 | −82.7 | −100 |

It can be seen from Table 1 and Table 2 that the fluidity of the fluid solidified soil prepared by the self-curing fluid solidified soil composite curing agent of the disclosure is not much different from that of the curing agent in the ratio, and is basically at the same level. However, the unconfined compressive strength of the fluid-solidified soil prepared by the present disclosure is generally higher than that of the curing agent in the ratio. The shrinkage deformation at different ages is less than that of the curing agent in the ratio, and it has obvious advantages of resistance to dry-wet cycle and freeze-thaw cycle, showing high durability. It is shown that the performance of the fluid solidified soil can be significantly improved by the raw material ratio and preparation steps provided by the disclosure, and the requirements of the related application scenarios for the performance of the fluid solidified soil can be better met. It can be seen that the disclosure has a significant effect on the improvement of unconfined compressive strength, drying shrinkage deformation control, and durability of fluid solidified soil. In summary, the fluid solidified soil prepared by a self-curing fluid solidified soil composite curing agent proposed in the disclosure shows the characteristics of early strength in the early stage, continuous development of strength in the later stage, small shrinkage deformation and excellent durability, which can meet the requirements of rapid construction and high-strength backfilling.

The above described embodiments are merely descriptive of the technical thoughts and characteristics of the present disclosure, and are intended to enable those skilled in the art to understand the contents of the present disclosure and implement it accordingly, which should not be construed as limiting the patent scope of the present disclosure; and equivalent variations or modifications made within the spirit disclosed by the present disclosure still fall within the patent scope of the present disclosure.

The invention claimed is:

1. A self-curing fluid solidified soil composite curing agent, which is composed of the following raw materials by mass percentage: 30-35% of cement, 10-20% of blast furnace slag, 10-20% of gypsum, 5-8% of calcium carbide slag, 30-39% of microbial curing agent, 1-5% of self-curing microbeads.

2. The self-curing fluid solidified soil composite curing agent according to claim 1, wherein the cement is selected from one of ordinary Portland cement, Portland cement, sulphoaluminate cement, and high belite sulphoaluminate cement.

3. The self-curing fluid solidified soil composite curing agent according to claim 1, wherein the slag is S95-grade slag powder, and a specific surface area is greater than or equal to 400 $m^2/kg$.

4. The self-curing fluid solidified soil composite curing agent according to claim 1, wherein a calcium sulfate content of the gypsum is greater than or equal to 80%.

5. The self-curing fluid solidified soil composite curing agent according to claim 1, wherein the mass content of calcium hydroxide in the calcium carbide slag is greater than or equal to 80%, and after drying at the temperature of 90° C. to 110° C. and grinding, the specific surface area is greater than 300 $m^2/kg$.

6. The self-curing fluid solidified soil composite curing agent according to claim 1, wherein the microbial curing agent is composed of a cementing solution with a volume ratio of 1:(2-4) and a *Bacillus pasteurii* solution.

7. The self-curing fluid solidified soil composite curing agent according to claim 6, wherein the cementing solution is composed of a urea aqueous solution with a concentration of 1 mol/L and a calcium chloride aqueous solution with a concentration of 1 mol/L having a volume ratio of 1:1.

8. The self-curing fluid solidified soil composite curing agent according to claim 6, wherein a $OD_{600}$ of *Bacillus pasteurii* solution is 0.8 to 1.2.

9. The self-curing fluid solidified soil composite curing agent according to claim 1, wherein the self-curing microbeads are prepared by the following method:
  (1) weighing raw materials according to the mass percentage: 15-25% of polyvinyl acetate with an average molecular weight of 100000-500000, 10-20% of urea, 55-60% of calcium chloride, 5-10% of sodium polyacrylate with a molecular weight of 1 to 15 million, and the nitrogen content of the urea is greater than or equal to 45%;
  (2) adding the sodium polyacrylate and calcium chloride to a granulator, stirring at 400-500 r/min to obtain a core material with a diameter of 1-1.5 mm;
  (3) grinding and sieving the urea through a 80-100 mesh sieve, adding the polyvinyl acetate, stirring for 1-3 min to obtain a mixed slurry;
  (4) loading the core material obtained by step (2) into a multi-functional granulating and coating machine, spraying the mixed slurry obtained by step (3), and solidifying to obtain self-curing microbeads with a diameter of less than 3 mm.

\* \* \* \* \*